Patented Mar. 5, 1935

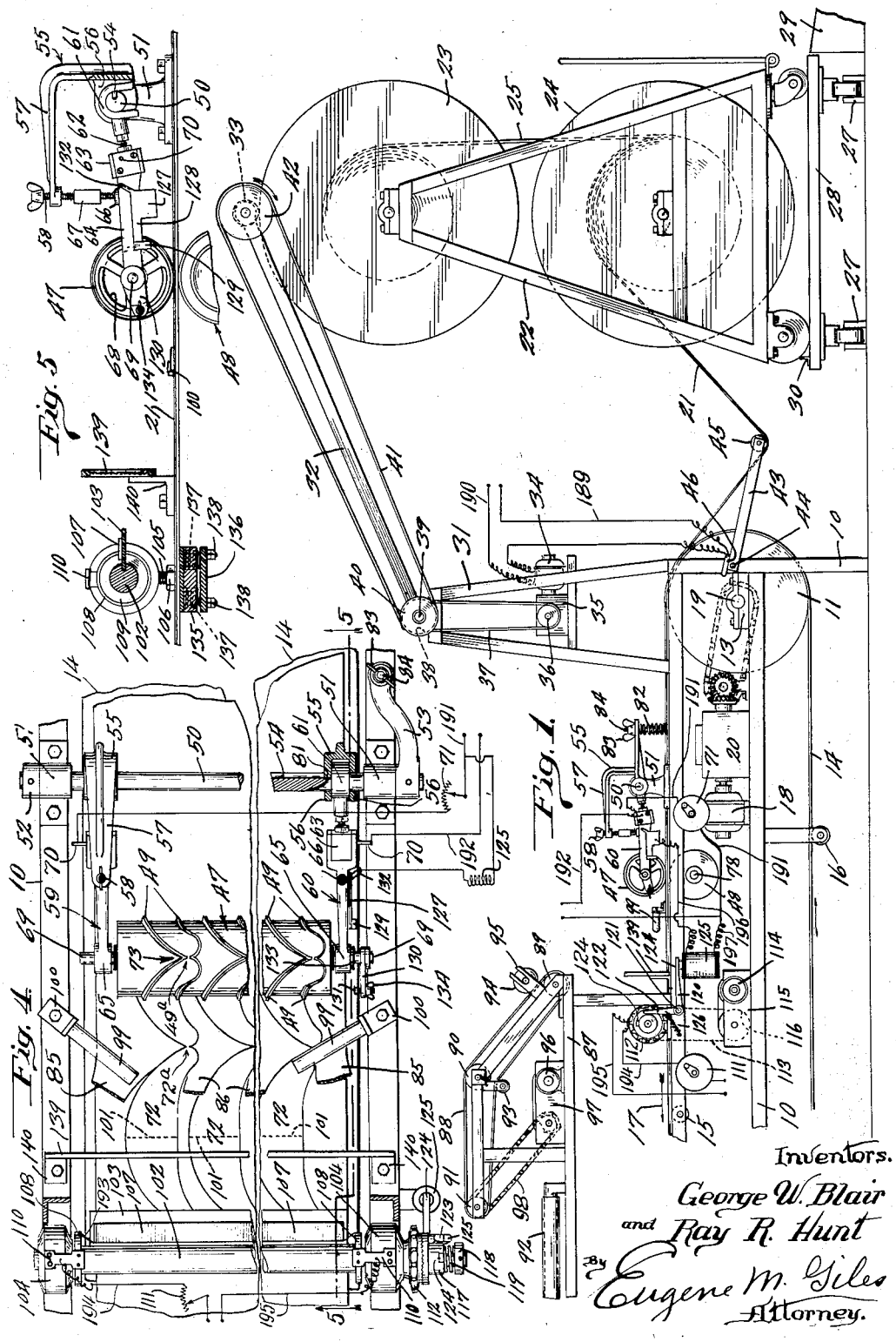

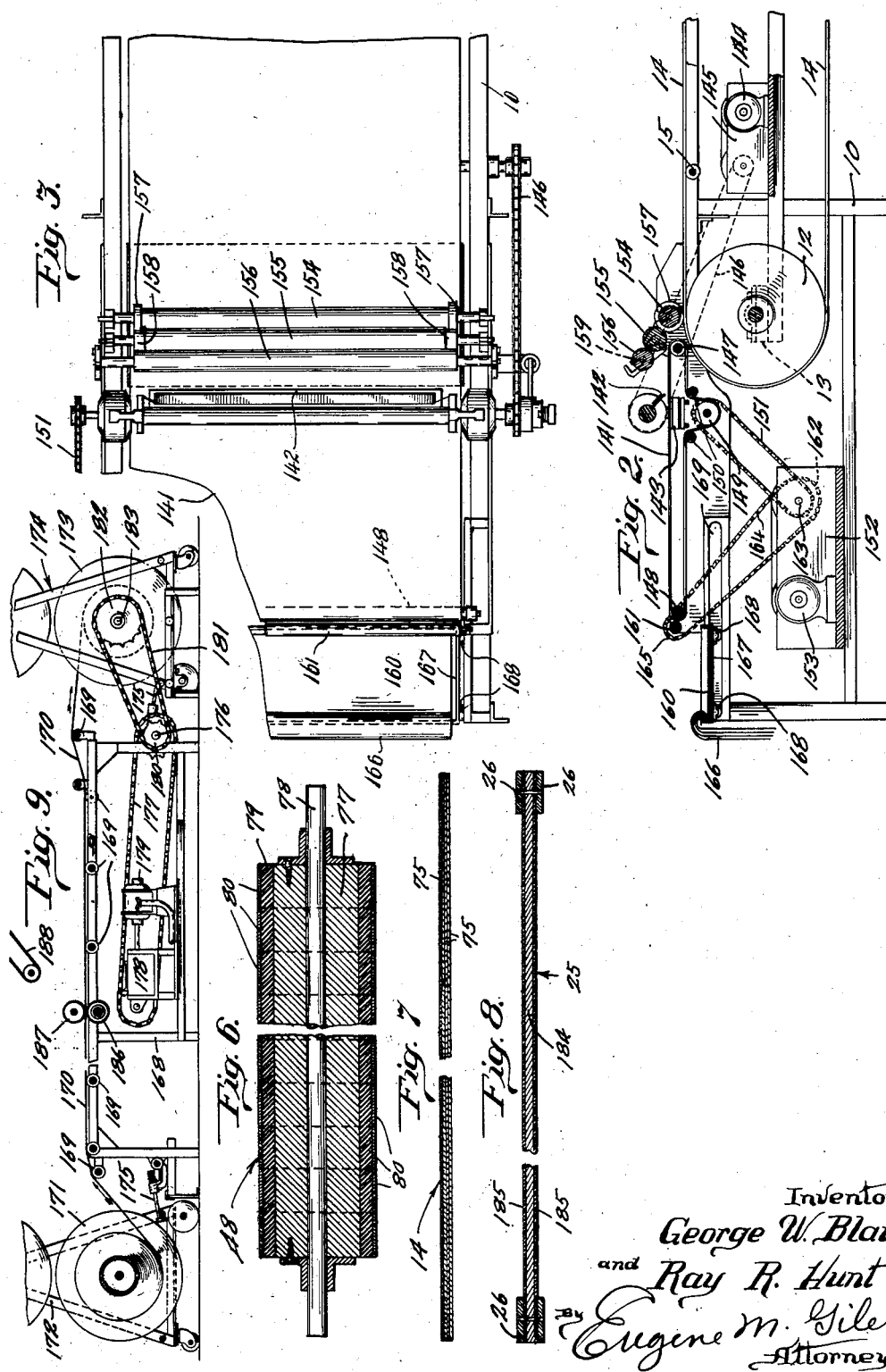

1,993,082

UNITED STATES PATENT OFFICE 1,993,082

METHOD OF AND APPARATUS FOR FORM-
ING SHEET RUBBER BLANKS

George W. Blair and Ray R. Hunt, Mishawaka,
Ind., assignors to Mishawaka Rubber and
Woolen Manufacturing Company, Mishawaka,
Ind., a corporation of Indiana Application January 7, 1932, Serial No. 585,378

17 Claims. (Cl. 18—2)

Our invention has reference to the forming of blanks of various desired sizes and shapes from uncured sheet rubber. The invention also includes the handling or accumulating of sheet rubber blanks in a manner and through facilities that may be advantageously employed in connection with the cutting operation.

The principal objects of our invention are to provide a simple and convenient method and apparatus whereby blanks of unvulcanized sheet rubber may be readily and quickly prepared; to construct the apparatus so that it is practically universal in the respect that it is readily adaptable and quickly changed for making blanks of substantially any desired size, shape and thickness; to provide improved means for removing the scrap rubber portions of the sheet after the blanks have been formed therefrom; and to provide improved means for accumulating or handling sheet rubber blanks,—these and other objects being accomplished with our invention as shown in the accompanying drawings in which,—

Fig. 1 is a side view of a portion of the apparatus at the end where the rubber stock is supplied for cutting into the blanks;

Fig. 2 is a similar view of a portion of the machine at the other end and shows a booking attachment that may be employed for accumulating the sheet rubber blanks;

Fig. 3 is a top view of the portion of the machine shown in Fig. 2 with a portion broken away;

Fig. 4 is an enlarged top view of the cutter mechanism with an intermediate portion broken away;

Fig. 5 is a sectional view on the line 5—5 of Fig. 4;

Fig. 6 is a longitudinal sectional view, with an intermediate portion broken away, of the cushion roll which is provided under the blanking roll;

Fig. 7 is a transverse sectional view of the belt on which the rubber is carried through the machine;

Fig. 8 is a transverse sectional view of the separator ribbon or belt of the rubber storage device, and Fig. 9 is a side view of a modified form of apparatus wherein the sheet rubber is maintained on the separator ribbon or belt of a storage device throughout the formation and accumulation of the blanks.

Referring to the drawings and particularly Figs. 1 to 8 inclusive which illustrate a form of apparatus for carrying out our invention, the reference numeral 10 indicates the main frame which is of any desired length and width and constructed in any desired manner, said frame being provided with drums 11 and 12 at the receiving and delivery ends respectively, which are journaled in bearings 13 on the main frame. An endless belt 14 is passed around these drums 11 and 12 with the upper length substantially at the level of the top of the main frame 10, and supported at suitable intervals by idler rolls 15 or otherwise to prevent sagging, the lower length of said belt 14 being likewise supported at intervals by idler rolls 16 which are journaled on the main frame. This belt 14 is operated so that the upper length travels in the direction indicated by the arrow 17 (see Fig. 1) and for this purpose a motor 18 may be employed and connected in any convenient manner with the shaft 19 of the drum 11 at the receiving or forward end of the machine, the driving connection preferably including a change speed device indicated generally at 20, whereby the speed of the drum 11 may be varied at the will of the operator. Details of the construction of the change speed device 20 are not given as these are standard units available on the market, as for example the well known Reeves type which consists of a V-belt running around a pair of sheaves which are adjustable to change their effective diameters and permit a gradual change of speed.

The sheet rubber that is to be formed into the blanks is fed onto the upper length of the belt 14 at the receiving end of the machine in a long strip which may be supplied thereto direct from the calender or otherwise, the sheet rubber being supplied in the illustrated embodiment from a sheet rubber storage device of the character shown in the application of Ray R. Hunt, Serial No. 436,549 filed March 17, 1930, the belt 14 of course being of a suitable width to readily accommodate this rubber strip which is indicated herein at 21.

The storage device above referred to comprises a portable frame 22 with upper and lower reels 23 and 24 respectively upon which is wound a separator ribbon or belt 25 with raised edges 26 which separate the convolutions of the separator ribbon or belt 25 sufficiently to accommodate the sheet rubber 21 freely therebetween, the rubber, in practice being wound with the separator ribbon on the lower reel 24 and the upper reel merely serving as a holder to and from which the separator ribbon or belt 25 is transferred as the rubber is wound on and unwound from the separator ribbon on the lower reel 24.

In practice a number of these rubber storage devices are provided and a filled one placed in position as soon as the rubber has been removed from the preceding one, and to facilitate the changing of the rubber storage devices and to avoid delay I prefer to provide a transverse track 27 beyond the forward end of the rubber cutting machine with a truck 28 thereon of sufficient length to accommodate two of the rubber storing devices, an approach 29 being provided along the side romote from the cutting machine for directing the rubber storage devices up onto the truck, and a guard rail 30 being provided on the truck 28 for stopping the storage devices in the proper position. With this construction a filled rubber storage device is run onto one end of the truck 28 while the rubber is being removed from the rubber storage device at the other end of the truck and as soon as the rubber is exhausted from the latter storage device another supply is immediately available by merely moving the truck 28 along the rails 27 to bring the filled storage device to the proper position at the end of the rubber cutting machine.

It is undesirable to unwind the rubber strip from the storage reel 24 by pulling on the rubber strip, and moreover it is necessary to wind up the separator ribbon or belt 25 on the upper reel 23 as the rubber strip 21 is unwound from the lower reel 24 and we have accordingly provided mechanism whereby the upper reel 23 is operated to wind the ribbon or belt 24 and feed the rubber from the lower reel 24 as it is required by the cutting machine. To this end an elevated support 31 is provided on the feed end of the main frame with an arm 32 pivoted at the top so that the outer end of said arm swings vertically and this arm has on its outer end a drum or pulley 33 which is positioned to engage the periphery of one of the circular ends of the upper reel 23 of the rubber storage device when the latter is in position to feed the rubber therefrom to the cutting machine. A motor 34 which is mounted in an elevated position on the support 31 is connected through a reduction gear 35, sprocket 36 and chain 37 with a sprocket 38 in the countershaft 39 and the latter through the sprocket 40 chain 41 and sprocket 42 operates the drum or pulley 33 in the proper direction so that when it is engaged with the reel 23 it will operate the latter to wind the ribbon or belt 25 on the upper reel 23 and thereby unwind said ribbon or belt from the lower reel 24 and at the same time unwind the rubber strip 21 from this lower reel for feeding to the cutting machine. The pulley or drum 33 normally rests on and in driving engagement with the periphery of the end wall of the upper drum 23 and when the rubber storage devices are to be changed is lifted in any convenient manner to an elevated position while the change is being made and then allowed to return to the normal position of engagement with the upper reel of the storage device.

Obviously the unwinding of the rubber strip 21 from the reel 24 must be regulated so that it is supplied as required by the cutting machine and for this purpose the operation of the motor 34 is controlled by the amount of slack in the rubber strip 21 between the reel 24 and the drum 11 of the cutting machine. This may be accomplished in any convenient manner, as for example by the frame 43 which is pivoted at 44 on the main frame 10 and provided at its outer or free end with a small roller 45 resting on the rubber strip so that the said roller is raised and lowered and the frame 43 swung on its pivot 44 as the amount of slack of the rubber strip 21 increases and decreases. A mercury switch indicated at 46 is mounted on the swinging frame 43 and one of the wires of the circuit 189, 190 through which current is supplied to the motor 34 leads through the mercury switch 46, the arrangement being such that when the motor 34 has operated sufficiently to accumulate a substantial amount of slack in the rubber strip 21 between the reel 24 and drum 11, the roller 45 drops down therewith and rocks the frame 43 so that the mercury switch 46 thereon is operated to break the circuit to the motor 34 so that it ceases to operate and then as this slack is taken up by the operation of the conveyor belt 14 the roller 45 is lifted and swings the frame 43 upwardly to the point where the mercury switch 46 operates to close the circuit to the motor 34 so that the latter is set in operation to feed rubber from the lower reel 24. Thus the supply of the rubber is automatically controlled by variations in the amount of slack between the reel 24 and the drum 11 and an ample supply provided at all times without any excessive or uneven pull on the rubber strip 21.

For cutting the rubber strip 21 into the blanks of the form and shape that may be required a cutter roll 47 is provided which rests on or is pressed against the top surface of the upper length of the belt 14 directly above an idler roll 48 of special form which supports the belt 14 at this place, said cutter roll 47 being readily removable and interchangeable at will with other cutter rolls which are formed to cut the rubber into various shapes and sizes of blanks that may be required. While these rolls are, for convenience, referred to herein as cutter rolls they do not cut the rubber sheet into the blanks in the sense that the term cutting is ordinarily understood but they are provided with ribs 49 arranged on the peripheral face of the roll in the proper configuration to form, by rolling engagement with the rubber sheet on the apron, blanks of the desired size and shape, and these ribs are heated to a suitable temperature to soften or melt the contiguous rubber sufficiently so that they penetrate readily through the rubber to the top surface of the belt 14 on which the rubber strip 21 is supported, said ribs being preferably formed with the side faces beveled or convergent so that they tend to spread apart and separate the edges of the rubber sufficiently to preclude sticking together of said severed edges.

For holding the so called cutter rolls 47 in proper position and to insure pressing of the heated ribs thereof entirely through the rubber sheet and against the top surface of the belt 14, a shaft 50 extends transversely and at an elevation above the upper length of the belt 14, being journaled at its ends in bearing brackets 51 on the side members of the main frame 10 and held against axial movement by a collar 52 on one end and a crank arm 53 on the other end. This shaft 50 has a key way 54 extending from end to end and carries a pair of brackets 55 which are alike and each has a pair of laterally spaced apertured ears 56 through which the shaft 50 extends, said ears being provided with lugs which engage the keyway 54 of said shaft so that while said brackets 55 are free to slide axially along the shaft 50 they are locked against turning movement thereon. Each bracket 55 has an upwardly extending portion terminating at its upper end in an arm 57 which extends toward the delivery end of the machine and at the end of each arm 57 is a threaded opening for an upright clamp screw 58 the lower end of which engages a connector indicated as a whole at 59 and 60 respectively, to which the roll 47 is attached and serves to hold the roll so that its cutting ribs or fins bear against the top surface of the belt 14.

The roll connectors 59 and 60 are substantially alike in construction and serve as links for connecting the ends of the roll 47 to the shaft 50 and each has a substantially hook shaped fitting 61 at the end which slips downwardly between the ears 56 of the respective bracket 55 and engages the portion of the shaft 50 therebetween. Each fitting 61 is adjustably connected by a threaded stem 62 to a block 63 of insulating material which has a metal arm 64 secured thereto so that it is insulated from the stem 62, said arm being extended toward the delivery end of the machine and formed at its free end with a bearing 65 for the shaft or trunnion of the cutter roll 47. The arm 64 also is provided with a seat 66 suitably located to be engaged by the lower end of the clamping screw 58 which is of insulated construction, being formed of upper and lower sections which are secured together and insulated from one another by a connector 67 of insulating material. With this construction it will be observed that the rolls not only may be quickly changed for cutting or forming blanks of various shapes but the mounting brackets may also be quickly adjusted to accommodate rolls of different diameters and lengths.

The rolls 47 on the peripheries of which the forms of the blanks are defined by the ribs or fins 49 may be of any desired construction, preferably of aluminum or some other efficient heat conductor and the ribs 49 are preferably of the same material, either formed integral with the roll or secured thereto in a manner to insure effective communication of heat from the roll to the ribs, and the ribs may be heated in any desired manner. Steam or other heating medium may be introduced into the interior of the roll if desired, although we prefer to heat the ribs in the manner shown herein wherein the roll is hollow and has an electrical heating element 68 located within the roll and adjacent the inner surface thereof. A stem or trunnion 69 is provided at each end of the roll 47 for engagement in the bearings 65 of the connectors or links 59 and 60 and these stems or trunnions 69 of the roll are insulated from one another and also from the roll itself so as to serve as terminals to which the respective ends of the heating element 68 are connected.

For supplying current to the heating element 68 the insulated arm 64 of each link 59 and 60 is provided with a tongue 70 or other suitable means permitting detachable connection of a flexible electrical conductor and one wire 191 of the circuit which supplies current to the heating element 68 leads to one of the terminals 70 through a rheostat 71 whereby the current may be controlled for regulating the heat supplied by the heating element 68, while the other circuit wire 192 leads to the other terminal 70.

With the construction above described the cutter roll 47 may be readily removed and replaced as it is merely necessary to back up the tension screws 58 sufficiently to permit the hooked ends of the links 59 and 60 to be lifted out of engagement with the shaft 50 whereupon the bearings 65 of these link members 59 and 60 may be slipped off of the stems or trunnions 69 and another roll substituted. Moreover cutter rolls 47 of any desired length may be employed as the brackets 55 may be slid along the shaft 50 to provide the necessary spaced mounting of the links 59 and 60 for the particular length of the roll. In fact a number of short cutter rolls may be used simultaneously by providing additional brackets 55 on the shaft 50 to accommodate additional links 59 and 60 for extra rolls. Moreover the cutter rolls 47 may be of different diameters inasmuch as the connecting links 59 and 60 therefor are free to swing on the shaft 50 so that their free bearing ends occupy any desired elevation and the tension screws 58 are capable of sufficient adjustment to engage said links when used with rolls of various diameters.

The diameter of the rolls depends somewhat upon the shape and size of the blanks to be cut out therewith as it is preferable that the circumference of the roll correspond to the length of the particular blank as for example that shown by way of illustration at 72 in Fig. 4 wherein the length of the blank is such that the cutting ribs 49 therefor extend entirely around the roll and meet at 73, or the circumference of the roll may correspond to a multiple of the length of the blank and have the ribs arranged therearound to cut a series of such blanks in each revolution of the roll. These ribs 49 may of course be arranged to cut out blanks in contiguous interfitting rows lengthwise of the sheet or in laterally spaced rows as shown in Fig. 4 or to simultaneously cut out blanks of a number of different sizes or shapes, it being desirable however that they be so arranged to permit convenient removal of the scrap and also to insure the presence of ribs at all places around the roll since the latter is supported by engagement of the ribs against the top surface of the belt, this rolling arrangement of the ribs on the belt being provided to insure penetration of the edges of the ribs entirely through the sheet rubber on the belt. The blanks may be entirely separate if desired but are preferably connected together in longitudinal series so as to insure pulling away from the cutting edge of the cutter and avoid following around with the cutter. Only a slight connection is required for this purpose and it may be provided as shown in Fig. 4 by notching the portion of the rib 49 as indicated at 49ª so that it leaves a narrow connection 72ª between the ends of the adjoining blanks.

The belt 14 may be of any desired construction which will properly support the rubber, maintain the blanks in place while the scrap is removed, permit the blanks to be readily removed and cooperate satisfactorily with the ribs 49 in forming the blanks, a belt that we have found satisfactory for this purpose being formed as shown in Fig. 7 of layers 75 of cotton sheeting rubberized and laminated together, a sufficient number of layers being employed so that the belt is strong and quite firm and of a cushiony character which will yield sufficiently under the pressure of the ribs 49 of the cutter roll to insure penetration of the ribs entirely through the rubber.

For supporting the belt 14 at the place where the cutting occurs an idler roll 48 is mounted directly below the cutter roll 47 in bearings on the main frame 10 and this roll 76 is important that this roll be of a cushion construction to compensate for variations in the thickness of the belt, variations in the surface of the cutters and variations in the pressure of the cutters and at the same time this roll must present a hard surface to insure a clean cut. In the present embodiment this roll 76 is formed with a wood core 77 which is secured on the shaft 78, the ends of which engage in bearings on the sides of the main frame 10, and this wood core 77 is covered with a thick layer 79 of soft rubber which is surrounded by a metal covering or shell made up of a series of short tubular sections 80 which are fitted sufficiently close together to provide a substantially continuous uninterrupted peripheral surface for the roll 76, and yet will permit independent yielding of the various sections of the surface of said roll as the cutting edges 49 of the roll 47 operate thereover, and by supplementing the cushiony effect of the belt 14 insure adequate co-operative engagement of the belt 14 with the cutting ribs 49 of the roll 47 at all points throughout the length of the latter so that these ribs 49 penetrate entirely through the rubber at all places around or along the edges of the blanks and thereby entirely sever the blanks from the scrap so that the latter may be removed from the belt 14 without disturbing the blanks which remain thereon.

The roll 47 is adjusted at the ends by means of the adjusting screws 58 to insure uniform engagement of the cutting ribs 49 with the belt 14 throughout the length of the roll 47, the brackets 55 on which the screws 58 are mounted being held against turning movement on the shaft 50 by the engagement of the bracket lugs 81 in the keyway 54 of said shaft 50, and the latter is resiliently held against turning movement in its bearings 51. To this end said shaft 50 has the arm 53 fixed thereon at one end and the outer end of this arm is engaged by a spring 82 which exerts a tension to rock the shaft 50 in a direction to hold the cutting roll 47 against the belt 14, the extent to which this rocking movement may take place being limited at the stage of adequate cutting or severing engagement of the cutter ribs 49 with the belt by the wing nut 83 on the threaded stem 84 which extends upwardly from the frame through the spring 82 and through an aperture in the end of the arm 53.

After the blanks have been cut or formed from the sheet rubber 21 by the operation of the cutter roll it is desirable to remove the scrap rubber which may be in various forms depending upon the configuration of the blanks that have been cut from the rubber sheet. There is, however, a portion along each edge of the rubber strip that is not used and in practice we arrange the ribs on the cutter roll so that each edge portion of the scrap is in a separate continuous strip as indicated at 85 in Fig. 4 and remove these edge strips of scrap progressively from the belt 21 just after the rubber passes the cutter roll 47. There may also be intermediate scrap portions and in such cases the cutter ribs are preferably so arranged that the intermediate scrap is formed in a continuous strip as indicated at 86 in Fig. 4 so that it may be removed at the same time as and with the same facilities as the edge scrap portions 85.

For removing the scrap, any suitable pick up mechanism may be employed, a convenient and satisfactory form being shown herein which is mounted on an elevated frame or super-structure 87 of the main frame 10 and comprises a belt 88 which extends across the machine and has the upper length trained upwardly at an inclination from the roll 89 over an intermediate idler roll 90 to the roll 91 where it discharges onto any suitable scrap collector which may be merely a platform or a cross conveyor belt 92 which is arranged to carry the scrap laterally to any desired place at the side of the machine. An idler roll 93 is provided to support the lower length of the belt 88 and at the forward end of said belt and substantially above the front roll 89 is an idler roll 94 the end trunnions or shaft ends of which are engaged in slotted or forked bearings 95 permitting this idler roll 94 to rest by gravity on the top surface of the belt 88 or any scrap strips thereon. For operating the belt 88 a motor 96 may be provided on the elevated frame 87 and connected in any convenient manner with the end roll 91 of said belt 88, it being desirable however to provide a change speed device 97 through which the motor may be connected by the chain 98 with a sprocket on the roller 91. The change speed device 97, like that hereinbefore referred to and indicated by the numeral 20, is of a type permitting gradual change of speed and may be adjusted to operate the belt 88 at the necessary rate to satisfactorily pick up the scrap rubber strips 85 and 86, it being understood that in some cases the scrap strips may be of a zig-zag form or stretch in the picking up operation sufficiently to require a higher rate of surface speed for the scrap pick up belt 88 than that of the rubber carrying belt 14. The scrap strips, of course, are fed under the roll 94 which exerts a yielding tension to hold the strips against the surface of the belt 88 and in the event that some of the scrap strips stretch out in the picking up operation to a greater length than others, the belt 88 is operated at a sufficiently high rate of speed to pick up the longer strips and the roll 94 may permit sufficient slippage of the shorter scrap strips to compensate for the different rate of pick up required for the longer and shorter scrap strips.

As hereinbefore indicated, the cushiony character of the belt 14 together with the manner in which it is held up in position at the cutter location serves to permit the edges of the cutter ribs 49 to press into the upper surface of the belt 14 sufficiently to insure complete severance of the blanks from the scrap, said ribs 49 being heated to a suitable temperature, governed by the rheostat 71, so that they will readily melt their way through the rubber without burning the fabric face of the belt 14, and because of this complete severance and the fact that the heat along the edges of the blank in the cutting operation tends to cause a slight adhesion of the blank to the surface of the belt 14, the scrap is quite readily removable without disturbing the blanks. As a safeguard, however, against pulling stresses on the scrap strips in a direction that might tend to disturb the blanks on the belt, as for example if the edge portions 85 of the scrap should be pulled inwardly toward the middle of the scrap removing belt 88, guides may be provided for the purpose of directing the scrap strips away from the blanks in a manner to avoid any interference with the blanks on the belt, two guides being shown in the present structure for this purpose which are arranged to direct the edge strips 85 of scrap laterally away from the contiguous blanks 72. These guides comprise rollers 99 which are mounted at an elevation above and at each edge of the belt 14 just beyond the cutter 47 on brackets 100 which are secured to the frame 10 in a manner to permit adjustment of the angularity of the guide rollers with respect to the direction of travel of the belt 14, and when these rollers are positioned substantially as indicated in Fig. 4 and the edge scrap strips 85 are engaged therewith, said scrap strips are pulled laterally and outwardly away from the blanks 72 in the scrap removal operation.

In the case of some blanks they may be formed complete by the cutter roll and in such cases said blanks, which remain on the belt 14 after the scrap is removed, are merely taken from the belt 14 in any convenient manner beyond the location of the cutter roll, the portion of the upper reach of the belt 14 beyond the cutter roll being preferably of sufficient length so that operators may stand therealong and pick up the blanks as the belt 14 passes the places where they are stationed.

In some cases, however, where the blanks are required to be cut along straight lines at right angles to the direction of movement of the belt 14 as for example when continuous strips are to be cut into certain lengths or in the case of the blanks 72 which are to be divided into two parts along the lines 101 (see Fig. 4) it is desirable to employ, in addition to the roll 47, a cross cutter which is preferably located beyond the place where the scrap is removed, so that it does not interfere with the scrap which it is desirable to maintain in continuous strip form for convenient removal. This cross cutter may be substantially the same as that shown and described in Patent No. 1,797,568 of March 24, 1931 to Frederick R. Dean and comprises a cross shaft 102 which has a heated dull edged cutter blade 103 secured thereto and extending transversely over the top of the upper length of the belt 14, said shaft 102 being supported at its ends in bearings 104 which are adjustably mounted on the respective side members of the frame 10 by threaded stems 105 which have lock nuts 106 thereon for securing the bearings 104 at a suitable elevation wherein the edge of the cutter blade 103, will, upon rotation of the shaft 102, engage against the top surface of the belt 14.

For heatng the blade 103 so that the edge thereof will melt its way through the rubber on the belt 14 an electrical heating element 107 is secured on the blade 103 at one side, the conductors 193 to and from the ends of said heating element being connected respectively to collector rings 108 which are mounted in an insulated manner on disks 109 which are fixed on the shaft 102 just inside the bearings 104. Each bearing 104 has a contact member or brush 110 mounted thereon in an insulated manner and extended inwardly over and bearing on the insulated peripheral ring 108 of the respective disk 109 and these contact members 110 are connected by the conductors 194 and 195 with a source of current from which current is supplied to the heating element 107, a rheostat 111 being connected in the circuit for regulating the supply of current so as to maintain the cutter blade 103 at the desired temperature.

For rotating the cutter 103 the shaft 102 is extended at one end beyond the bearing 104 and has a sprocket 112 loosely mounted thereon and driven by a chain 113 from any suitable source of power as for example from a motor 114 which is connected through a change speed device 115, of the type hereinbefore referred to, and sprocket 116 with the driving chain 113 of the sprocket 112.

The outer face of the sprocket 112 is formed with clutch teeth to co-operate with corresponding clutch teeth on the inner face of a clutch plate 117 which is keyed on the shaft 102 in the usual manner to rotate therewith and slide axially thereon, and on the outer end of the shaft is fixed a collar 118 between which and the hub of the clutch plate 117 is a spring 119 which exerts a tension to force the plate 117 into clutching engagement with the sprocket 112. A bell crank 120 is pivoted at 121 on the machine frame and has an upstanding arm 122 positioned so that the upper end thereof is located at the side of the hub of the clutch plate 117 and said upper end of the arm 122 is formed with an inclined clutch disengaging face 123 positioned to be engaged by a lug 124 on the hub of the clutch plate 117 at a certain point in the rotation of the shaft 102 and withdraw the clutch plate 117 from engagement with the sprocket 112, a stop shoulder 125 being provided on the arm 122 at the base of the inclined face 123 in position to be engaged by the lug 124 to arrest movement of the shaft 102 when this clutch is fully disengaged.

The other arm 124 of the belt crank 120 extends forwardly from the pivot 121 over a solenoid 125 which serves, when energized, to pull the outer end of the arm 124 downwardly and disengage the upper end of the trip arm 122 from the clutch lug 124 so that the clutch is free to be engaged through the medium of the spring, and as soon as the current to the solenoid 125 is interrupted the trip arm 122 is returned by the spring 126 to the normal position wherein it will disengage the clutch and arrest movement of the shaft 102 upon the completion of a revolution of the latter.

To insure accurate timing of the energizing of the solenoid 125 so that the cutter 103 will operate to cut the blanks from the rubber cutter roll at the proper place the current supply to the solenoid 125 is controlled by the cutter roll itself by making contact at a predetermined point in its rotation with a conductor to close the circuit which supplies current to the solenoid. The current for energizing the solenoid is supplied from the same source as that for the heating element 68 and for this purpose one of the links to which the roll 47 is attached, namely the link 60 herein, is provided on the outer side with a conductor 127 which is mounted in an insulated manner on the arm 64 of said link and provided with a spring arm 128 extending toward the axis of the roll 47 and terminating at a distance therefrom in a head 129 having an inclined outer face. The roll which is to be employed for cutting the blanks that are to be subsequently operated upon by the cross cutter 103, and which is illustrated herein at 47 has a crank arm 130 fixed thereon at the proper place so that a contact member 131 at the outer end will engage the inclined face of the head 129 at the proper time, to operate the cross cutter 103, the circuit of the solenoid including a flexible conductor 196 having a detachable connection with a stud 132 of the conductor 127 whereby when the member 131 makes contact with the head 129, current from the source of supply for the heating element 68 is supplied through the shaft 69 at the corresponding end of the roll 47 and through the crank arm 130, contact member 131, head 129, spring extension 128, conductor 127 and stud 132 to the flexible conductor 196 above referred to which forms the connection between the stud 132 and the solenoid, the latter of course having a return conductor 197 connecting with the source of current for completing the circuit.

In order to maintain a proper relative axial location of the crank arm 130 and contact member 131 with respect to the head 129 and prevent relative axial displacement that would alter the timing of the contact whereby the solenoid 125 is energized, the shaft or trunnion 69 to which the crank arm 130 is attached preferably has a spool 133 fixed thereon and the bearing 65 of the link 60 is open at the bottom so as to slip downwardly between the spool ends in somewhat the same manner as the hook 61 at the other end of the link engages the shaft 50, and as the spool 133 and crank 130 are fixed on the shaft 69 relative axial displacement or shifting of the contact members 129 and 131 is prevented.

The contact member 131 however is adjustable, and to this end is threaded through the outer end of the crank 130 and provided with a winged lock nut 134, and the face of the head 129 with which this member 131 makes contact is inclined so that by adjusting the contact member 131 the moment of contact may be advanced or retarded slightly for permitting a fine adjustment of the time of operation of the solenoid 125 and of the cutter 103 which is controlled thereby, so that the latter is caused to effect the cutting operation at the proper place in the blanks, as for example along the lines 101 of the blanks 72 of Fig. 4.

For supporting the belt 14 at the place where the cross cutter 103 operates a cutting block 135 similar to that of the above mentioned Dean patent is employed, said block being mounted on a cross plate 136 of the machine frame 10 and resiliently held up against the under surface of the belt 14 by a plurality of springs 137, the elevation of the block 135 by said springs being limited by the bolts 138 which are connected with the block 135 and extend loosely through apertures in the block supporting plate 136.

A guard 139 is preferably provided at the front of the cross cutter 103 to prevent accidental catching of the hands or fingers of the operator under the cutter blade 103, which said guard may consist of a section of screen mounted in a marginal frame and secured at its ends to the side members of the main frame 10 by the brackets 140.

The blanks which are cut from the rubber sheet 21 may be removed by hand from the belt 14 beyond the cross cutter 103 or special facilities may be provided for removing same, such for example as the special booking attachment, shown in Figs. 2 and 3, at the delivery end of the belt 14. With this booking attachment the blanks are preferably formed by an appropriate roll 47 into continuous strips which are fed forward on the belt 14 to the delivery end of the machine, the cross cutter 103 being removed at the time or disconnected so that it remains inactive. At the delivery end of the belt 14, these continuous strips are fed onto or transferred to another endless belt 141 which, at the receiving end is provided with a cross cutter 142 and a cushion cutting block 143 both of which may be similar in all respects to the cross cutter 103 and the cutting block 135 respectively that have been hereinbefore described, the cross cutter 142 being driven in the same manner as the cutter 103, from a motor 144 through a change speed device 145 and a chain 146 which leads to a clutch sprocket at the shaft of the cutter 142.

The belt 141 passes around the small idler rolls 147 and 148 at the receiving and discharge ends respectively and has the lower length passed under a driving roll 149 and over idler rolls 150 at each side thereof, said driving roll being provided at one end with a sprocket which is connected by the chain 151 through a speed changing device 152 with the motor 153 which drives the conveyor belt 143, the latter being preferably operated by proper adjustment of the speed changing device 152 at a higher rate of surface speed than the belt 14 so as to effect a separation of the blanks as they are cut to length by the cutter 142.

The receiving end of the belt 141 is located somewhat as shown in Fig. 2, above the drum 12 and in order to step the strips of connected blanks from the belt 14 up onto the belt 141 a series of rolls 154, 155 and 156 are provided, the first mentioned of which has its shaft ends engaged in vertically slotted bearings and has slightly enlarged ends 157 which rest on the marginal edge of the belt 14 above the drum 12 and by their frictional engagement with the belt operate the roll 154 in a clockwise direction as it is viewed in Fig. 2. The second roll 155 which is located slightly above and at the side of the roll 154 also has its shaft ends engaged in slotted bearings which are inclined toward the roll 154 and said roll 155 has slightly reduced ends 158 which rest on the enlarged ends 157 of the roll 154 and afford a frictional engagement whereby the roll 155 is driven at a slightly greater surface speed than and in a direction reverse to that of the roll 154.

The rubber strips from the belt 14 are passed under the roll 154, then upwardly over the roll 155 and downwardly therefrom onto the belt 141, and the roll 156 has its shaft ends loosely engaged in slotted bearings 159 which extend substantially radially from the axis of the roll 155 and permit the roll 156 to rest by gravity against the outer surface of the rubber strips on the roll 155 for holding said strips sufficiently engaged with the roll 155 to be fed thereby onto the belt 143.

The cutter 142 may be variously operated or controlled to effect the cross cutting operation at the proper time. In some cases the clutch with which this cutter 142 is provided, and which is similar to the clutch of the cutter 103, may be permitted to remain constantly engaged and the cutter 142 may be constantly rotated at a suitable rate of speed which is so regulated by the speed changing device 145 to cut the rubber strips into the required lengths. In other cases, and particularly when the cross cut is required at a certain place determined by the longitudinal configuration of the strip a clutch controlling solenoid may be provided and connected for operation by the cutter roll at 47 which produces the longitudinal configuration of the strips, said solenoid being operated by said roll in the same manner as the solenoid 125 of Figs. 1 and 4. In still other cases an operator may stand at the clutch end of the roll 142 and by watching the progress of the strip determine the proper time for operation of the cutter 142 and control the operation thereon by manual pressure on the arm of the clutch controlling bell crank that corresponds to the arm 124 of the clutch controlling bell crank of the cutter 103.

The belt 141 as hereinbefore indicated, is preferably operated at a somewhat greater surface speed than that of the belt 14 which supplies the strips thereto and as a result the blanks as they are severed by the cutter 142 from their respective strips are separated or spaced apart longitudinally on the belt, and as these blanks reach the end of the upper length of the belt 141 they are dropped off the end thereof into a book 160. It has been found however that the deposit of the blanks onto the book 160 cannot be satisfactorily and uniformly accomplished by merely permitting them to drop off of the belt 141 as the latter makes the return bend around the roll 148 and special provision is required to insure proper removal of the blanks. This is effectively accomplished by mounting a small roll 161 along and close to the discharge end of the belt substantially as shown in Figs. 2 and 3 and rotating same in the same direction as the roll 148 but at a rate of surface speed greater than that of the belt 141 and the blanks then readily pass from the belt 141 onto the small roll 161 and drop therefrom onto the book 160 as required for the booking operation.

This roll 161 may be operated in any desired manner as for example from a drive sprocket 162 on the shaft 163 of the change speed device 152 through the chain 164 to the sprocket 165 on the shaft of the roll 161, the ratio of the driving connections of the roll 161 and the roll 149 being such that the roll 161 will be operated at a suitably faster surface speed than the belt 141 at any rate of operation of the latter.

The book 160 in which the blanks are deposited from the belt and stripper roll 161 may be of a character commonly employed in rubber manufacturing which comprises a bottom plate with a number of leaves 166 of fabric secured thereto along the edge and which are successively laid down over the preceding leaf after a number of blanks of sheet rubber have been laid upon the latter leaf so that the newly laid down leaf covers and protects the blanks on the leaf immediately below and affords a new surface upon which additional blanks may be deposited.

For booking the blanks as they are discharged from the belt 141 a tray 167 of suitable size to contain a book 160 is located under the discharge end of the belt 141 and provided with supporting rollers or wheels 168 operating in elongated slot like tracks 169 which are provided on the side members of the machine frame 10 or an extension thereof so that the tray 167 with the book thereon may be readily moved by the operator back and forth under the discharge end of the belt 141 in the direction of the length of the latter.

With this construction a book 160 is placed in the tray 167 with all the leaves thrown back to the position shown at 166 in Fig. 2 and with the tray and book pulled out until only the inner edge of the book 160 is under the stripper roll 161, a transverse series of blanks is permitted to run off the stripper roll 161 until the leading ends of the blanks touch the surface of the book. The latter is then pushed inwardly at a rate corresponding to the rate of feed of the blanks and the latter permitted to gradually lay down on the exposed leaf of the book until the final ends of the transverse series of blanks are disengaged from the roll 161 and drop down flat on the leaf of the book, whereupon the tray 161 and book thereon are quickly pulled outwardly, the next succeeding leaf 166 thrown over to cover the blanks that have just been deposited and the tray and book then pushed inwardly at the proper time and rate to have another series of blanks deposited on the newly turned down leaf. This operation is repeated until the book is filled whereupon the filled book is removed from the tray 167 and an empty book substituted and filled in like manner.

Instead of storing the blanks in books they may be cut out on the winding ribbon or belt of the rubber reel on which the rubber sheet is wound and after the scrap is removed the winding ribbon or belt with the blanks thereon may be rewound on another reel, an apparatus for this purpose being shown in Fig. 9. The apparatus comprises a frame 168 of any suitable construction having a series of idler rolls 169 over which the winding ribbon or belt 170 is passed from the reel 171 of a rubber winding device 172 at one end of the frame 168 to the reel 173 of a rubber winding device 174 at the other end, these rubber winding devices, like that of Fig. 1, being of a portable character and preferably of substantially the construction shown and described in the Hunt application above referred to, and these rubber winding devices 172 and 174 are held in the proper location at the respective ends of the frame 168 by adjustable connectors 175 on the frame 168 which engage with a portion of the frame of the respective winding devices 172 or 174.

These winding devices 172 and 173 have upper and lower reels the former of which, in the normal use of said devices, are merely employed as indicated in Fig. 1 to wind up the separator ribbon as the sheet rubber is removed from the convolutions of separator ribbon on the lower reel and to supply the separator ribbon to the lower reel when sheet rubber is being wound thereon, but in the embodiment of our invention as illustrated in Fig. 9 the upper reels of the winding devices are not used, as the winding ribbon together with the rubber sheet thereon is passed from the lower reel 171 of the winding device 172 over the frame 168 where the blanks are cut out and the scrap removed, and then this ribbon, which is indicated in Fig. 9 at 170, and which has the cut out blanks remaining thereon, is wound on the reel 173 of the other winding device 174.

For propelling the separator ribbon 170 with the rubber thereon over the top of the frame, any suitable mechanism may be employed, as for example a countershaft 176 may be mounted on the end of the frame 168 where the receiving reel 173 is located and have a chain connection 177 with a change speed device 178 through which a motor 179 operates the shaft 176 at rates of speed that may be varied at will by the operator.

A sprocket 180 on the countershaft 176 drives through a chain 181 to the sprocket 182 which is detachably secured on the exposed end of the shaft 183 of the reel 173 so that after winding of the separator ribbon 170 on said reel has been completed said sprocket 182 may be readily removed, and mounted on the shafts 183 of the winding devices 173 that are successively used at this place.

Obviously the rate of speed of the winding ribbon 170 over the top of the table or frame 188 will progressively increase as the separator 170 builds up into an increasingly larger roll on the reel 173 and this may be controlled either automatically or manually by adjusting the change speed device 178 to compensate for the increasing diameter of the roll. It is to be noted however that it is not necessary to maintain a uniform and unvarying rate of speed of the separator ribbon 170 inasmuch as the rubber cutting devices are operated by the separator ribbon and the rubber thereon and accordingly at a rate of speed corresponding to that of the separator ribbon 170.

The separator ribbon or belt 170 on which the sheet rubber is passed over the frame 168 and on which the blanks are cut from the sheet rubber is somewhat similar to the belt 14 hereinbefore described, being made up as shown in Fig. 8 of a body layer 184 of chip board or the like with a fabric layer 185 adhesively secured thereon at both sides, said ribbon or belt 170 however being provided with raised portions or extra thickness along the edges as indicated at 26 in Fig. 8 so that when wound on a reel an intervening space is provided between the convolutions to freely accommodate the sheet rubber with the outer surface of the sheet rubber spaced from the overlying convolution of the separator ribbon or belt.

An idler roll 186 of a construction similar to the roll 76 hereinbefore described is mounted on the frame 168 to support the portion of the separator ribbon 170 between the raised edges 26 and above this roll 186 is a cutter roll 187 which co-operates with the cushion roll 186 to cut the rubber on the belt 170 into the desired blanks after which the scrap is removed by a scrap remover 188.

Details of the construction and arrangement of the cutter roll 187 and scrap remover 188 are not shown as the cutter roll may be of the same construction and mounted and heated in the same manner as the cutter roll 47 of Figs. 1, 4 and 5 and provided with the ribs 49 arranged thereon in the particular configuration of the blank to be cut from the rubber sheet, and the scrap remover 188 may likewise be of the same construction as the scrap removal facilities that are shown in and described in connection with Fig. 1. Moreover the apparatus of Fig. 9 may, if desirable or necessary in forming blanks of certain configuration, be provided with a cross cutter similar to that shown at the left hand ends of Figs. 4 and 5.

The portable winding devices such as shown herein are, as indicated in the above mentioned Hunt application, employed in practice to receive directly from the calender a long strip of sheet rubber, which is wound with the separator ribbon on the lower reel, and after cooling on the separator ribbon, is transported on the portable winding device to the place where it is to be used, and it is a cooled and set rubber of this character that is supplied from the winding device 172 on the separator ribbon 170 to the cutting devices of Fig. 9, a similar rubber being also supplied in the structure of Fig. 1 but in that case removed from the separator ribbon of the winding device and transferred to the belt 14 before being cut into blanks.

The heated ribs of the cutter 187, like those of the cutter 47 penetrate entirely through the rubber sheet so that the scrap may be readily separated from the blanks and removed by the scrap remover 188 or otherwise, and the natural slight adhesion of the uncured rubber to the surface of the winding ribbon 170 supplemented by the additional adhesion of the edges of the blanks to the ribbon 170 which is occasioned by the heat and pressure of the cutter ribs as they are pressed through the rubber, insures sufficient adherence of the blanks to the winding ribbon 170 so that they may be readily wound therewith in a roll on the lower reel 173 of the portable frame 174 and thus stored for future use.

In the operation of the blank forming apparatus disclosed herein it is important that the cutters be maintained at a comparatively uniform temperature which not only is insufficient to cause injury to the belt upon which the rubber is supported in the cutting or blank forming operation but which is also insufficient to cause partial vulcanization of the rubber when it is being cut and yet the temperature should be sufficiently high so that the cutting or blank forming ribs will readily melt their way through the rubber, the term "melt" being used herein to signify a softening of the rubber which will permit the ribs to readily penetrate therethrough. The slight adhesive of the blanks to the belt which is occasioned in the cutting operation is usually sufficient to retain the blanks properly on the belt, particularly after the belt has been used for a short time, as the cutting operation leaves on the surface of the belt a little soft rubber along the lines of the cutting operations and thereby conditions the surface so that the blanks will readily adhere thereto. In the event, however, that the adhesive occasioned by the cutting operation is insufficient a roller may be mounted over the belt beyond the cutters in a manner similar to the roll 94 of the scrap remover device so as to press the blanks more firmly onto the belt.

Instead of removing the blanks from the belt the latter may be lengthened out and have assembling operations performed on or with the blanks while they are carried along on the belt. Moreover, instead of removing the scrap from the belt and leaving the blanks thereon, the procedure may be reversed, or in other words the blanks may be removed from the belt while the scrap is retained thereon and the latter removed or discharged at the delivery end of the belt. Furthermore it is not essential that the cutting operations be carried out simultaneously across the entire width of the rubber on the supporting belt. In the case of the structure shown in Fig. 9, for example, patterns or blanks may be cut along one edge of the rubber strip and then the cutters wound inwardly and the rubber strip and supporting apron passed back over the cutter frame in the reversed direction to cut another row of blanks and so on until the entire width of the rubber strip has been utilized. This permits cutting with small cutting rolls and eliminates a large percentage of scrap.

While we have shown and described our invention in a preferred form, we are aware that various changes and modifications may be made therein without departing from the principles of our invention, the scope of which is to be determined by the appended claims.

We claim as our invention:

1. The method of forming blanks of unvulcanized sheet rubber, which comprises supporting a sheet of rubber at substantially room temperature on a cushiony surfaced belt, and progressively melting along the sheet a channel which corresponds to the configuration of the blank and extends through the rubber to the cushiony surface of the belt.

2. The method of forming blanks of unvulcanized sheet rubber, which comprises applying on a supporting surface a sheet of rubber at substantially room temperature, melting away around the margin of the portion of the sheet that is to constitute the blank, a sufficient width of rubber to entirely free the blank from the scrap, and then lifting the scrap from the supporting surface while the blank is retained thereon.

3. The method of forming blanks of unvulcanized rubber, which comprises supporting on a cushiony surfaced belt a sheet of rubber at substantially room temperature and applying progressively along the sheet and through the rubber in indenting relation to the cushiony surface of the belt, blank defining ribs of a temperature and contour to melt away, around the margin of the portion of the sheet that is to constitute the blank, a sufficient width of rubber to entirely free the blank from the scrap.

4. The method of forming blanks of unvulcanized sheet rubber, which comprises sheeting the rubber in a calendar, then after cooling of the sheeted rubber substantially to room temperature and while supported on a cushiony surface, progressively melting along the sheet a channel which corresponds to the configuration of the blank and extends through the rubber to the cushiony surface.

5. The method of forming and handling blanks of unvulcanized sheet rubber, which comprises winding a long strip of sheet rubber from the calender between convolutions of a separator ribbon which are spaced apart a distance greater than the thickness of the rubber, then after the rubber has cooled substantially to room temperature forming blanks from the sheet rubber while on the separator ribbon and removing the scrap therefrom, and then rewinding the separator with the blanks thereon in a roll the convolutions of which are spaced apart a distance greater than the thickness of the rubber blanks.

6. The method of forming and handling blanks of unvulcanized sheet rubber which comprises supporting on the surface of a belt a sheet of rubber at substantially room temperature, forming the blanks from the sheet and simultaneously heating and slightly sticking the marginal edges of the blank to the belt and then removing the scrap and leaving the blanks on the belt.

7. The method of forming blanks of unvulcanized sheet rubber which comprises supporting on a cushiony surfaced belt a sheet of rubber at substantially room temperature, and forming each blank in successive independent stages by melting away a width of rubber at each stage along a different part of the margin of the portion of the rubber sheet that is to constitute the blank.

8. In an apparatus for forming sheet rubber blanks the combination of a frame, a belt operable therealong and having a cushiony surface for supporting a sheet of rubber from which the blanks are to be formed, a rotary member having peripherally extending blank forming ribs arranged to progressively engage along and press against the cushiony surface of the belt, and means for heating said ribs to a temperature to melt through the sheet rubber on the belt.

9. In an apparatus for forming sheet rubber blanks, the combination of a frame, a belt operable therealong for supporting a sheet or rubber from which the blanks are to be formed, a rotary member having peripherally extending blank forming ribs arranged to progressively engage along and press against the belt, means for heating said ribs to a temperature to melt through the sheet rubber on the belt, and a belt support under the said rotary member and engaging the under side of the belt, individual portions of said belt support throughout the length of said rotary member being independently yieldable under pressure of the ribs of the rotary member against the top surface of the belt.

10. In an apparatus for forming sheet rubber blanks, the combination of a frame, a belt operable therealong for supporting a sheet of rubber from which the blanks are to be formed, a rotary member having peripherally extending blank forming ribs arranged to progressively engage along and press through the sheet of rubber and against the belt, and a belt supporting roll under said rotary member having a hard supporting surface composed of a longitudinal series of adjoining independently yieldable sections.

11. In an apparatus for forming sheet rubber blanks the combination of a frame, blank forming devices, and means on which a sheet of rubber from which the blanks are to be formed is moved to the blank forming devices, said blank forming devices including a quickly detachable and adjustable mounting and connections whereby blank forming rolls of various lengths and diameters are adapted to be selectively held in optional blank forming positions adjacent the aforesaid means and detachably connected with a source of heat.

12. In an apparatus for forming blanks from sheet material, the combination of a pair of complementary devices operable in sequence on the sheet material to first divide the sheet longitudinally into connected series of blanks and thereafter divide said connected series into separate blanks, a belt on which the sheet material is fed from one blank forming device to the other, and means for lifting the scrap rubber from the portion of the belt between said devices.

13. In an apparatus for forming blanks from unvulcanized sheet rubber the combination of a pair of reels, a separate ribbon windable on said reels and having spacing means along the edges for separating the adjoining convolutions of the ribbon and providing a space therebetween to freely accommodate sheet rubber, a frame between the reels over which the ribbon is transferred from one reel to the other reel, and blank forming devices mounted on the frame and operable between the edge spacing means of the ribbon and against the surface of the ribbon therebetween to form blanks from a sheet of rubber on the ribbon.

14. In an apparatus for forming blanks from unvulcanized sheet rubber the combination of a pair of reels, a separator ribbon windable on said reels and having spacing means along the edges for separating the adjoining convolutions of the ribbon and providing a space therebetween to freely accommodate sheet rubber, a frame between the reels over which the ribbon is transferred from one reel to the other reel, blank forming devices mounted on the frame and operable between the edge spacing means of the ribbon and against the surface of the ribbon therebetween to form blanks from a sheet of rubber on the ribbon, and means on the frame operable to lift the scrap rubber from the belt at a point between the blank forming devices and the reel upon which the ribbon is being wound.

15. In an apparatus for forming and handling sheet rubber blanks, the combination of blank forming means, a blank carrying apron at the end of which the blanks are discharged therefrom, and a book mounted to reciprocate under the discharge end of the apron to receive the blanks on the successive pages thereof.

16. In an apparatus for forming and handling sheet rubber blanks, the combination of blank forming means, a blank carrying apron at the end of which the blanks are discharged therefrom, a book mounted to reciprocate under the discharge end of the apron to receive the blanks on the successive pages theerof, and a stripper roll at the end of the apron and operable in the same direction as and at a higher surface speed than the apron.

17. The method of forming blanks progressively throughout the length of a sheet of rubber, which comprises supporting the rubber sheet at the blank forming location on a cushiony surface, progressively depressing portions of said surface corresponding to the outline of the blanks that are to be formed from the rubber sheet and simultaneously melting through the rubber sheet, over the progressing depressed portions of said surface, channels which separate the blanks from the rubber sheet.

GEORGE W. BLAIR.
RAY R. HUNT.